United States Patent
Lee

(10) Patent No.: US 7,345,734 B2
(45) Date of Patent: Mar. 18, 2008

(54) DISPENSER SYSTEM FOR LIQUID CRYSTAL DISPLAY PANEL AND DISPENSING METHOD USING THE SAME

(75) Inventor: In-Kyu Lee, Chungcheongbuk-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 185 days.

(21) Appl. No.: 10/825,244

(22) Filed: Apr. 16, 2004

(65) Prior Publication Data

US 2005/0140920 A1    Jun. 30, 2005

(30) Foreign Application Priority Data

Dec. 30, 2003    (KR) ............... 10-2003-0100836

(51) Int. Cl.
*G02F 1/1339*    (2006.01)
(52) U.S. Cl. ............... 349/190; 349/153; 349/187
(58) Field of Classification Search ............... 349/187, 349/189–190, 153–154
See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,742,370 A | 4/1998 | Kim et al. |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |

(Continued)

FOREIGN PATENT DOCUMENTS

EP    1 003 066    5/2000

(Continued)

*Primary Examiner*—Dung T. Nguyen
(74) *Attorney, Agent, or Firm*—McKenna, Long & Aldridge LLP

(57) ABSTRACT

A dispenser system for a liquid crystal display panel includes a table, a rotatable plate on the table, a substrate disposed on the plate, the substrate having a plurality of first image display parts and a plurality of second image display parts, and at least one syringe supplying a sealant material onto the substrate to sequentially form a plurality of first seal patterns and a plurality of second seal patterns, wherein each of the plurality of first seal patterns are formed along outer edge portions of the first image display parts and each of the plurality of second seal patterns are formed along outer edge portions of the second image display parts.

10 Claims, 9 Drawing Sheets

U.S. PATENT DOCUMENTS

| | | | |
|---|---|---|---|
| 5,875,922 | A | 3/1999 | Chastine et al. |
| 5,952,676 | A | 9/1999 | Sato et al. |
| 5,956,112 | A | 9/1999 | Fujimori et al. |
| 6,001,203 | A | 12/1999 | Yamada et al. |
| 6,011,609 | A | 1/2000 | Kato et al. |
| 6,016,178 | A | 1/2000 | Kataoka et al. |
| 6,016,181 | A | 1/2000 | Shimada |
| 6,055,035 | A | 4/2000 | von Gutfeld et al. |
| 6,163,357 | A | 12/2000 | Nakamura |
| 6,219,126 | B1 | 4/2001 | Von Gutfeld |
| 6,226,067 | B1 | 5/2001 | Nishiguchi et al. |
| 6,236,445 | B1 | 5/2001 | Foschaar et al. |
| 6,304,306 | B1 | 10/2001 | Shiomi et al. |
| 6,304,311 | B1 | 10/2001 | Egami et al. |
| 6,337,730 | B1 | 1/2002 | Ozaki et al. |
| 6,414,733 | B1 | 7/2002 | Ishikawa et al. |
| 2001/0021000 | A1 | 9/2001 | Egami |
| 2004/0114094 | A1* | 6/2004 | Kim et al. ............... 349/187 |
| 2004/0207797 | A1* | 10/2004 | Sakurada ............... 349/153 |

FOREIGN PATENT DOCUMENTS

| | | |
|---|---|---|
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 6-313870 | 11/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | S62-054225 | 3/1987 |
| JP | S62-054228 | 3/1987 |
| JP | S62-054229 | 3/1987 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H05-036425 | 2/1993 |
| JP | H05-036426 | 2/1993 |
| JP | H05-107533 | 4/1993 |
| JP | 5-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | H06-018829 | 1/1994 |
| JP | 6-51256 | 2/1994 |
| JP | H06-064229 | 3/1994 |
| JP | 6-148657 | 5/1994 |
| JP | 6-160871 | 6/1994 |
| JP | H06-194637 | 7/1994 |
| JP | 6-235925 | 8/1994 |
| JP | 6-265915 | 9/1994 |
| JP | 7-84268 | 3/1995 |
| JP | 7-128674 | 5/1995 |
| JP | 7-181507 | 7/1995 |
| JP | H07-275770 | 10/1995 |
| JP | H07-275771 | 10/1995 |
| JP | H08-076133 | 3/1996 |
| JP | 8-95066 | 4/1996 |
| JP | 8-101395 | 4/1996 |
| JP | 8-106101 | 4/1996 |
| JP | H08-110504 | 4/1996 |
| JP | H08-136937 | 5/1996 |
| JP | 4-171094 | 7/1996 |
| JP | 8-190099 | 7/1996 |
| JP | H08-173874 | 7/1996 |
| JP | 8-240807 | 9/1996 |
| JP | 9-5762 | 1/1997 |
| JP | 9-26578 | 1/1997 |
| JP | H09-001026 | 1/1997 |
| JP | 9-61829 | 3/1997 |
| JP | 9-73075 | 3/1997 |
| JP | 9-73096 | 3/1997 |
| JP | H09-094500 | 4/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | H03-009549 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-201750 | 7/2001 |
| JP | 2001-209052 | 8/2001 |

| | | | | | |
|---|---|---|---|---|---|
| JP | 2001-209056 | 8/2001 | JP | 2002-169166 | 6/2002 |
| JP | 2001-209057 | 8/2001 | JP | 2002-169167 | 6/2002 |
| JP | 2001-209058 | 8/2001 | JP | 2002-182222 | 6/2002 |
| JP | 2001-209060 | 8/2001 | JP | 2002-202512 | 7/2002 |
| JP | 2001-215459 | 8/2001 | JP | 2002-202514 | 7/2002 |
| JP | 2001-222017 | 8/2001 | JP | 2002-214626 | 7/2002 |
| JP | 2001-235758 | 8/2001 | JP | 2002-229042 | 8/2002 |
| JP | 2001-183683 | 9/2001 | JP | 2002-236276 | 8/2002 |
| JP | 2001-255542 | 9/2001 | JP | 2002-258299 | 8/2002 |
| JP | 2001-264782 | 9/2001 | JP | 2002-236292 | 9/2002 |
| JP | 2001-272640 | 10/2001 | JP | 2002-277865 | 9/2002 |
| JP | 2001-281675 | 10/2001 | JP | 2002-277866 | 9/2002 |
| JP | 2001-281678 | 10/2001 | JP | 2002-277881 | 9/2002 |
| JP | 2001-282126 | 10/2001 | JP | 2002-287156 | 10/2002 |
| JP | 2001-305563 | 10/2001 | JP | 2002-296605 | 10/2002 |
| JP | 2001-330837 | 11/2001 | JP | 2002-311438 | 10/2002 |
| JP | 2001-330840 | 11/2001 | JP | 2002-311440 | 10/2002 |
| JP | 2001-356353 | 12/2001 | JP | 2002-311442 | 10/2002 |
| JP | 2001-356354 | 12/2001 | JP | 2002-323687 | 11/2002 |
| JP | 2002-14360 | 1/2002 | JP | 2002-323694 | 11/2002 |
| JP | 2002-23176 | 1/2002 | JP | 2002-333628 | 11/2002 |
| JP | 2002-49045 | 2/2002 | JP | 2002-333635 | 11/2002 |
| JP | 2002-079160 | 3/2002 | JP | 2002-333843 | 11/2002 |
| JP | 2002-080321 | 3/2002 | JP | 2002-341329 | 11/2002 |
| JP | 2002-82340 | 3/2002 | JP | 2002-341355 | 11/2002 |
| JP | 2002-90759 | 3/2002 | JP | 2002-341356 | 11/2002 |
| JP | 2002-90760 | 3/2002 | JP | 2002-341357 | 11/2002 |
| JP | 2002-107740 | 4/2002 | JP | 2002-341358 | 11/2002 |
| JP | 2002-122870 | 4/2002 | JP | 2002-341359 | 11/2002 |
| JP | 2002-122872 | 4/2002 | JP | 2002-341362 | 11/2002 |
| JP | 2002-122873 | 4/2002 | KR | 2000-0035302 | 6/2000 |
| JP | 2002-131762 | 5/2002 | | | |
| JP | 2002-139734 | 5/2002 | | | |
| JP | 2002-156518 | 5/2002 | | | |

* cited by examiner

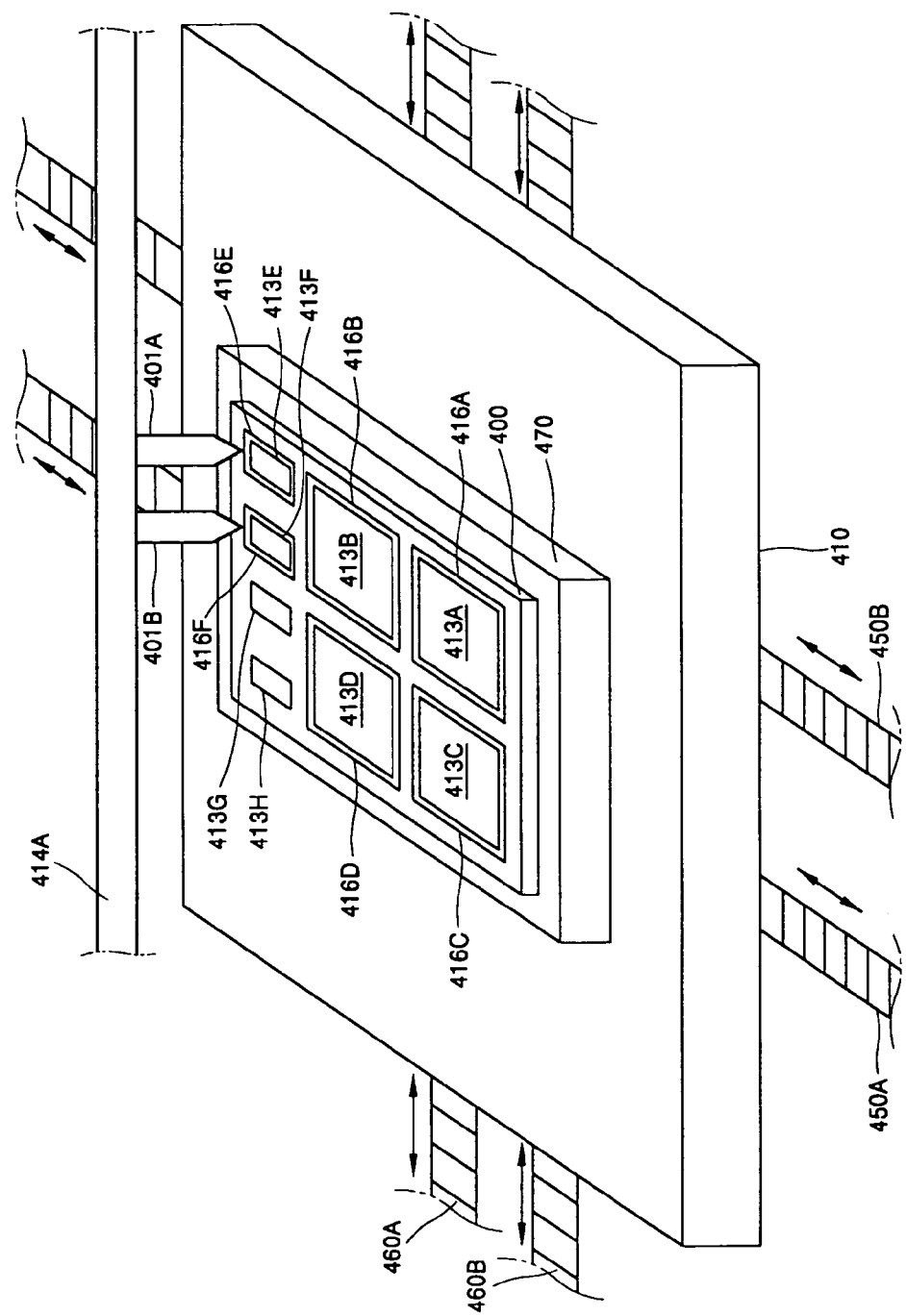

DISPENSER SYSTEM FOR LIQUID CRYSTAL DISPLAY PANEL AND DISPENSING METHOD USING THE SAME

The present invention claims the benefit of Korean Patent Application No. 100836/2003 filed in Korea on Dec. 30, 2003, which is hereby incorporated by reference.

BACKGROUND OF THE INVENTION

1. Field of the Invention

The present invention relates to a dispenser and a dispensing method using the dispenser, and more particularly, to a dispenser system for a liquid crystal display panel and a dispensing method using the dispenser system.

2. Description of the Related Art

In general, liquid crystal display (LCD) devices display images based upon data signals that are supplied to individual liquid crystal cells arranged in a matrix configuration. Accordingly, light transmittance of each of the individual liquid crystal cells is controlled to display the images.

The LCD devices commonly include a liquid crystal display panel having pixels arranged in a matrix configuration, and a gate driving unit and a data driving unit for driving the pixels. The liquid crystal display panel includes a color filter (CF) substrate and a thin film transistor (TFT) array substrate attached together to face each other using a seal pattern formed along outer edge portions of an effective image display part. Accordingly, spacers are formed on either the TFT array substrate or the CF substrate to provide a uniform cell gap between the attached CF and TFT array substrates, and a liquid crystal layer is positioned between the CF and TFT array substrates within the cell gap. In addition, one of the TFT and CF substrates includes a common electrode.

A plurality of data lines and a plurality of gate lines are perpendicularly provided on the liquid crystal display panel for transmitting data signals supplied from the data driving unit to the pixels and for transmitting scan signals supplied from the gate driving unit to the pixels. Accordingly, the pixels are defined at crossings of the data and gate lines. In addition, each of the pixels includes a thin film transistor (TFT) for switching the data signals transmitted via the data lines from the data driving unit and includes a pixel electrode for receiving the data signals via the TFT.

The gate driving unit sequentially supplies the scan signals to the gate lines so that the pixels arranged in the matrix configuration can be sequentially selected on a line-by-line basis. Additionally, the data signals are supplied to a selected one of the pixels from the data driving unit.

Accordingly, when a voltage is supplied to the common electrode and a voltage of the data signals supplied to the pixel electrode is controlled, liquid crystals of the liquid crystal layer are rotated due to dielectric anisotropy of the liquid crystals according to an electric field induced between the common and pixel electrodes. Thus, transmission of light through the liquid crystal layer may be controlled in order to display an image.

FIG. 1 is a plan view of a liquid crystal display panel according to the related art. In FIG. 1, a liquid crystal display panel 100 includes an image display part 113 having liquid crystal cells arranged in a matrix configuration, a gate pad part 114 connected to gate lines of the image display part 113, and a data pad part 115 connected to data lines. The gate pad part 114 and the data pad part 115 are formed along edge regions of a TFT array substrate 101 that do not overlap with a CF substrate 102. The gate pad part 114 supplies scan signals from the gate driver integrated circuit (IC)(not shown) to the gate lines of the image display part 113, and the data-pad part 115 supplies data signals from the data driver IC (not shown) to the data lines of the image display part 113.

Although not shown, a TFT for switching the liquid crystal cells is provided at each intersection of the data and gate lines. In addition, a pixel electrode (not shown) for driving the liquid crystal cells connected to the TFT (not shown) is provided on the TFT array substrate 101. Moreover, a passivation film (not shown) for protecting the TFT is formed along an entire surface of the TFT array substrate 101.

Although not shown, color filters are provided within the cell regions and are separated by a black matrix, and a common transparent electrode is provided on the CF substrate 102. In addition, a cell gap is formed by spacers provided between the TFT array substrate 101 and the CF substrate 102, wherein the TFT ad CF substrates 101 and 102 are attached to each other by a seal pattern 116 formed along outer edges of the image display part 113.

During fabrication of the liquid crystal display panel, a plurality of individual liquid crystal display panels are simultaneously formed on a large-scale mother substrate. Thus, a process for separating the individual liquid crystal display panels from the large-scale mother substrate is necessary. The process commonly includes cutting and processing the mother substrate to separate each of the plurality of individual liquid crystal display panels. Then, liquid crystal material is injected through a liquid crystal injection opening 118 formed in the seal pattern 116 in order to form a liquid crystal layer within the cell gap between the TFT array substrate 101 and the CF substrate 102. Finally, the liquid crystal injection opening 118 is sealed.

Fabrication of the liquid crystal display panel, includes separate fabrication of the TFT array substrate 101 and the CF substrate 102 on separate first and second mother substrates. Then, the first and second mother substrates are attached together to maintain a uniform cell-gap therebetween. Next, the attached first and second mother substrates are cut into unit panels, and the liquid crystal material is injected into the cell gap between the TFT array substrate 101 and the CF substrate 102.

FIG. 2 is a plan view of image display parts formed on a large-scale mother substrate according to the related art. In FIG. 2, six image display parts 210 are separately formed at regular intervals on a mother substrate 200. The total number and placement of the six image display parts 210 are determined based on sizes of the mother substrate 200 and the image display parts 210.

FIG. 3 is an enlarged plan view of the image display parts formed on the mother substrate of FIG. 2 according to the related art. In FIG. 3, if larger image display parts 220 are fabricated when using a fixed size of the mother substrate 200, only four image display parts 220 can be formed on the mother substrate 200. Accordingly, a portion of the mother substrate 200 not large enough for the image display parts 220 to be formed is discarded as a dummy region 230. Thus, efficient use of the mother substrate 200 is degraded, productivity is degraded, and unit costs increase.

SUMMARY OF THE INVENTION

Accordingly, the present invention is directed to a dispenser system for a liquid crystal display panel and a dispensing method using the dispenser system that substantially obviates one or more of the problems due to limitations and disadvantages of the related art.

An object of the present invention is to provide a dispenser system for a liquid crystal display panel capable of forming image display parts in different sizes on a large-scale mother substrate.

Another object of the present invention is to provide a dispenser method for a liquid crystal display panel capable of forming image display parts in different sizes on a large-scale mother substrate.

Another object of the present invention is to provide a dispenser system for a liquid crystal display panel capable of reducing processing time required for formation of seal patterns along image display parts.

Another object of the present invention is to provide a dispenser method for a liquid crystal display panel capable of reducing processing time required for formation of seal patterns along image display parts.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a dispenser system for a liquid crystal display panel includes a table, a rotatable plate on the table, a substrate disposed on the plate, the substrate having a plurality of first image display parts and a plurality of second image display parts, and at least one syringe supplying a sealant material onto the substrate to sequentially form a plurality of first seal patterns and a plurality of second seal patterns, wherein each of the plurality of first seal patterns are formed along outer edge portions of the first image display parts and each of the plurality of second seal patterns are formed along outer edge portions of the second image display parts.

In another aspect, a dispensing method for a liquid crystal display panel includes loading a substrate onto a table, the substrate having a plurality of first image display parts and a plurality of second image display parts, supplying a sealant material onto the substrate to form a plurality of first seal patterns along each outer edge portion of the plurality of first image display parts, rotating the substrate, and supplying the sealant material onto the substrate to form a plurality of second seal patterns along each outer edge portion of the plurality of second image display parts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 6A to 6D are schematic perspective views of an exemplary dispensing method using a dispenser system according to the present invention.

DETAILED DESCRIPTION OF THE ILLUSTRATED EMBODIMENTS

Reference will now be made in detail to the illustrated embodiments of the present invention, examples of which are illustrated in the accompanying drawings.

Figure 1:
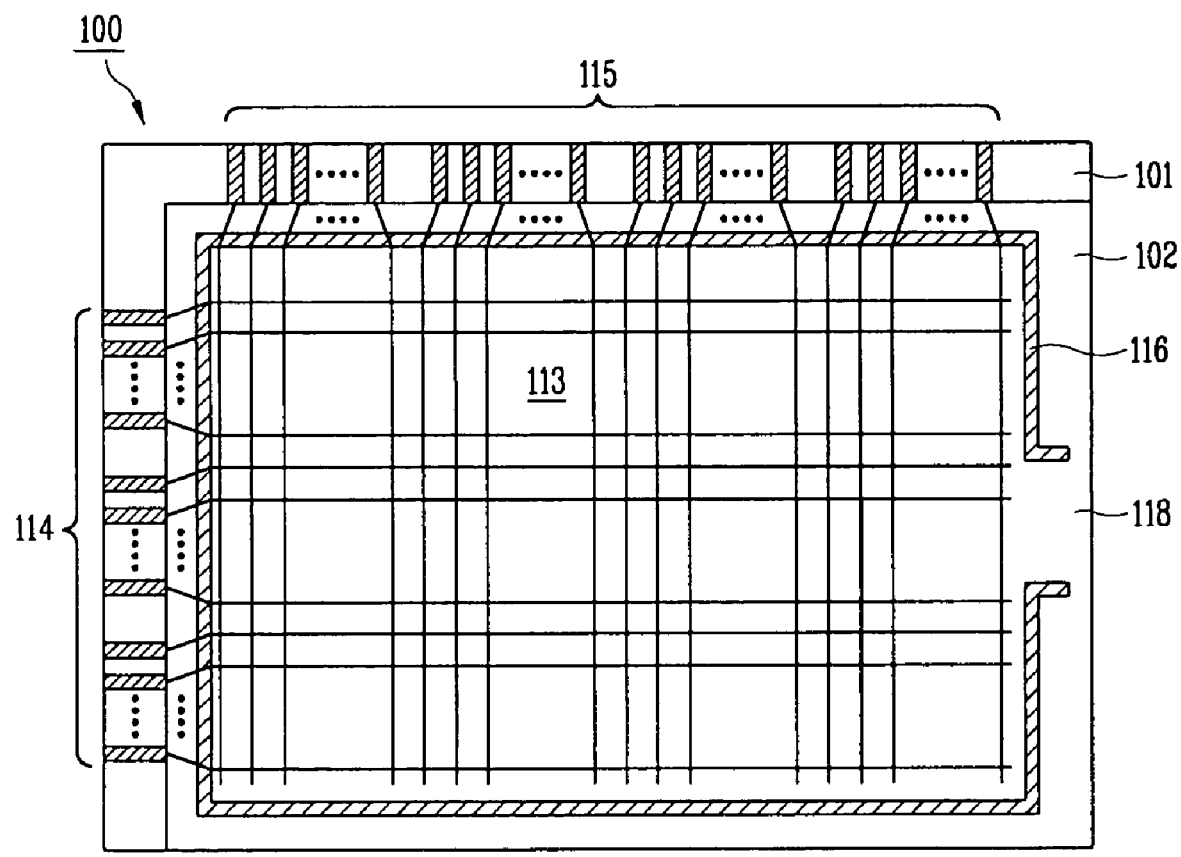
FIG. 1 is a plan view of a liquid crystal display panel according to the related art.
Figure 2:
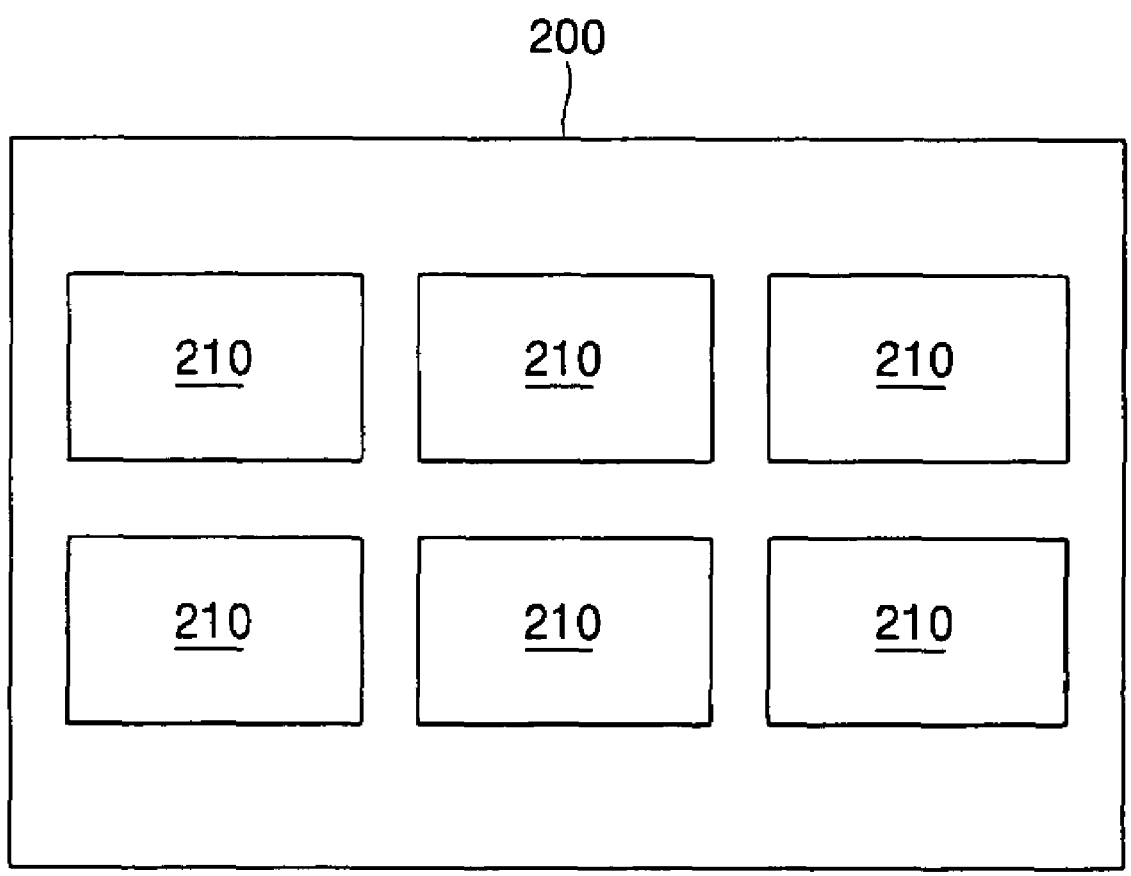
FIG. 2 is a plan view of image display parts formed on a large-scale mother substrate according to the related art.
Figure 3:
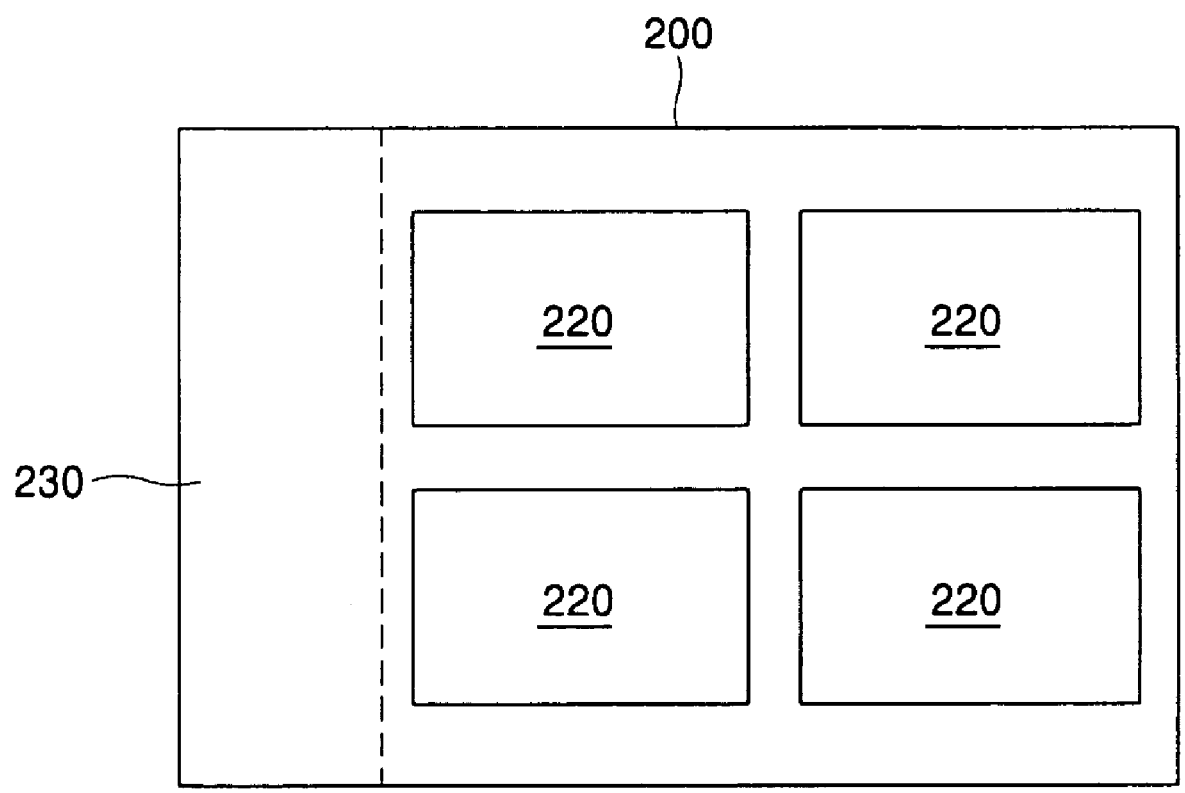
FIG. 3 is an enlarged plan view of the image display parts formed on the mother substrate of FIG. 2 according to the related art.
Figure 4:
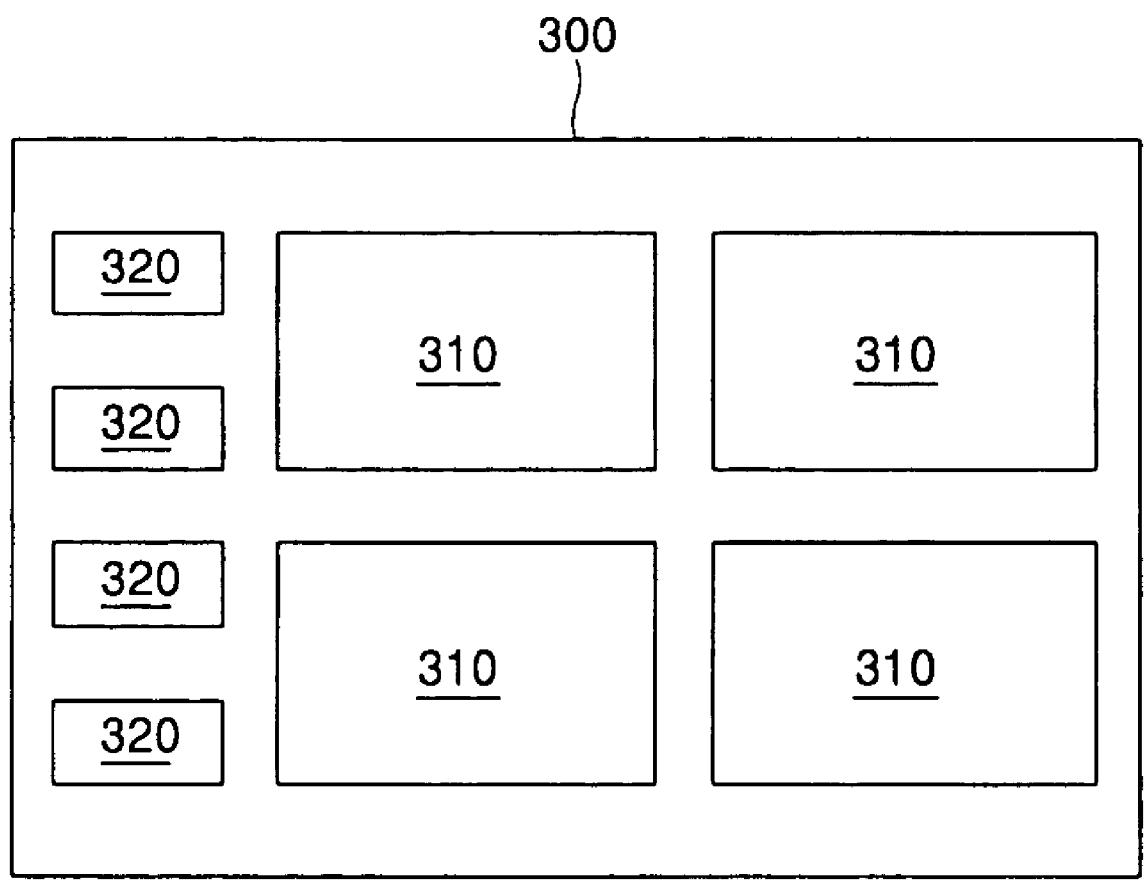
FIG. 4 is a plan view of exemplary image display parts formed on the large-scale mother substrate according to the present invention.

FIG. 4 is a plan view of exemplary image display parts formed on the large-scale mother substrate according to the present invention. In FIG. 4, a mother substrate 300 may include first image display parts 310 of a first size separately formed at first intervals and second image display parts 320 of a second size separately formed at second intervals. Since the second image display parts 320 may be of a smaller size than the first image display parts 310, no dummy region may be formed on the mother substrate 300 of FIG. 3.

Figure 5:
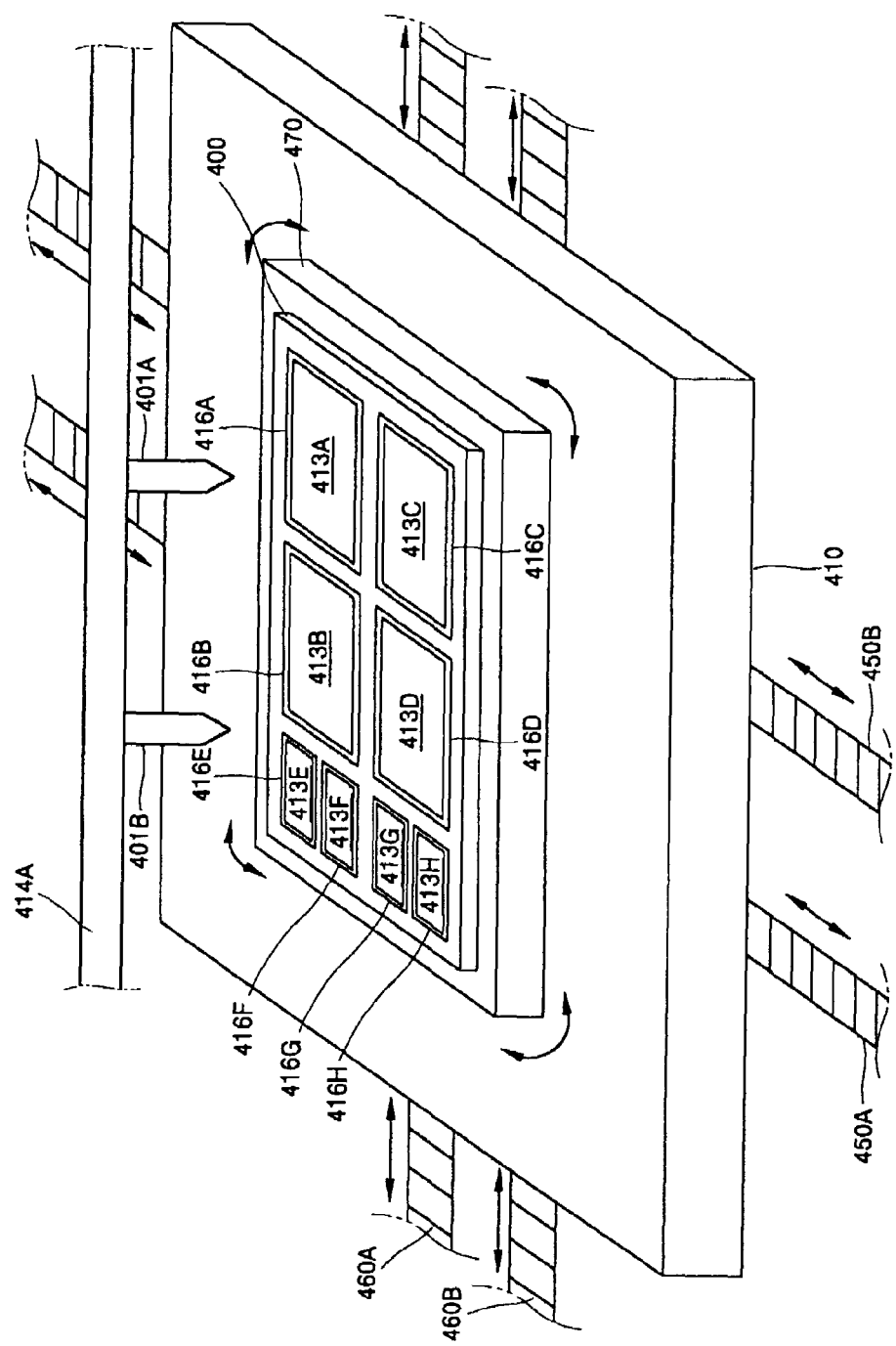
FIG. 5 is a schematic perspective view of an exemplary dispenser system for a liquid crystal display panel according to the present invention.

FIG. 5 is a schematic perspective view of an exemplary dispenser system for a liquid crystal display panel according to the present invention. In FIG. 5, a dispenser system for a liquid crystal display panel may include a substrate 400 upon which first image display parts 413A~413D of a first size and second image display parts 413E~413H of a second size may be formed, a table 410 upon which the substrate 400 may be loaded, first and second syringes 401A and 401B for supplying sealant material on the substrate 400 to sequentially form first seal patterns 416A~416D and second seal patterns 416E~416H along outer edge portions of the first image display parts 413A~413D and the second image display parts 413E~413H, a supporting bar 414A for aligning and fixing the first and second syringes 401A and 401B, first drivers 450A and 450B for driving the table 410 along a direction parallel to a shorter side of the substrate 400, second drivers 460A and 460B for driving the table 410 along a direction parallel to a longer side of the substrate 400, and a rotating plate 470 for rotating the table 410 by about 90°.

In FIG. 5, the substrate 400 may be a first large-scale mother substrate, such as glass, upon which a plurality of TFT array substrates may be formed. Alternatively, the substrate 400 may be a second large-scale mother substrate, such as glass, upon which a plurality of CF substrates may be formed.

The first and second syringes 401A and 401B may be aligned and fixed along the supporting bar 414A, and may be disposed to correspond to each single row of the first image display parts 413A~413D formed on the substrate 400. Accordingly, more than or less than two syringes may be aligned and fixed along the supporting bar 414A according to the number the first image display parts 413A~413D formed on the substrate 400. Moreover, a total number of syringes may be determined based upon numerous different processing factors, such as desired processing time and size and configuration of the substrate 400.

The first and second syringes 401A and 401B may be provided to correspond to every region of the first image display parts 413A~413D. In addition, a plurality of supporting bars 414A may be provided to align and affix the first and second syringes 401A and 401B. Accordingly, the first seal patterns 416A~416D may be simultaneously formed along each outer edge portion of the first image display parts 413A~413D. For example, if the first image display parts 413A~413D are formed on the substrate 400 in a matrix configuration of an M-number of lines and an N-number of columns, an M×N number of syringes 401A~401M×N may be provided to correspond to every region of the image display parts 413A~413M×N. In addition, the M×N number of syringes 401A~401M×N may be aligned and affixed at an M-number of supporting bars 414A~414M. Thus, the syringes 401A~401M×N aligned and affixed at the M-number of supporting bars 414A~414M may simultaneously form first seal patterns 416A~416M×N along each outer edge portion of the first image display parts 413A~413M×N. Alternatively, the first seal patterns 416A~416M×N may be formed by line or column units of the first seal patterns 416A~416M×N.

Figure 6A:
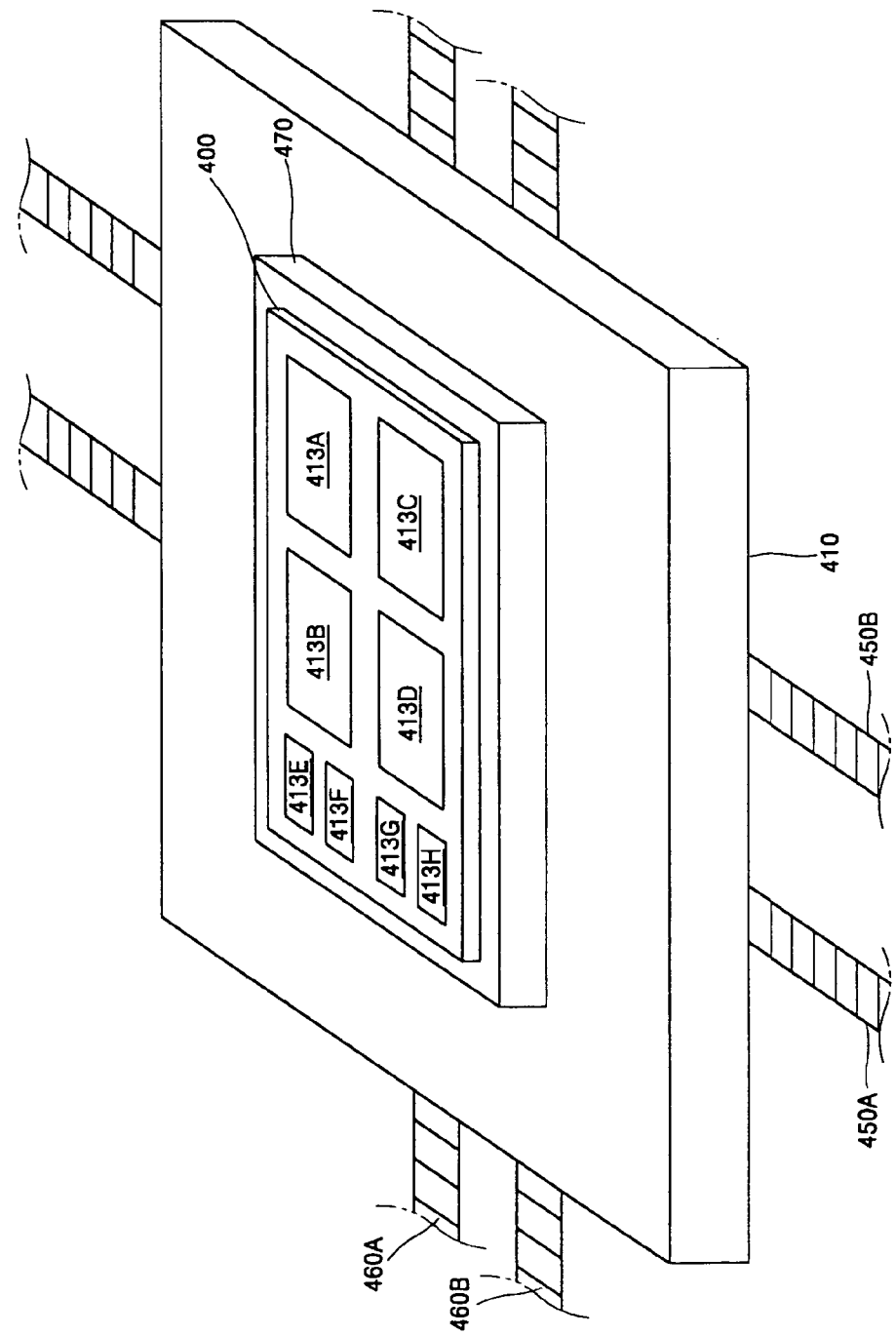

FIGS. 6A to 6D are schematic perspective views of an exemplary dispensing method using a dispenser system according to the present invention. In FIG. 6A, a substrate 400 may be loaded onto a table 410. The substrate may include the first image display parts 413A~413D of the first size and the second image display parts 413E~413H of the second size.

Figure 6B:
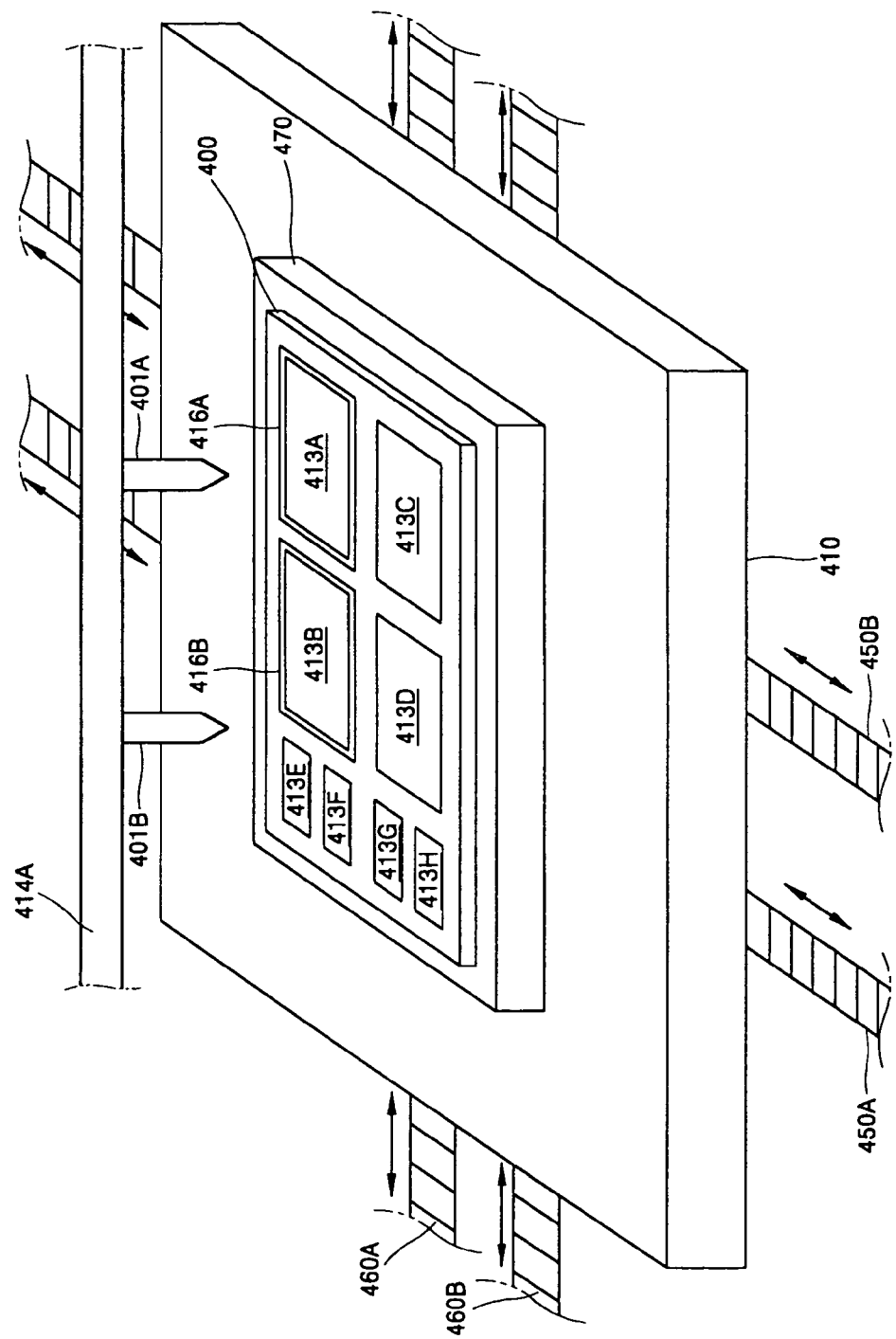

In FIG. 6B, when the table 410 is driven along the direction parallel to the shorter side of the substrate 400 using the first drivers 450A and 450B, sealant material may be supplied onto the substrate 400 using the first and second syringes 401A and 401B to form each shorter side of the first seal patterns 416A and 416B. Similarly, when the table 410 is driven along the direction parallel to the longer side of the substrate 400 using the second drivers 460A and 460B, each longer side of the first seal patterns 416A and 416B may be formed, thereby forming the first seal patterns 416A and 416B at each outer edge portion of the first image display parts 413A and 413B.

In addition, the processes shown in FIGS. 6A and 6B may be repeated in order to form the first seal patterns 416C and 416D along each outer edge portion of the first image display parts 413C and 413D.

Figure 6C:
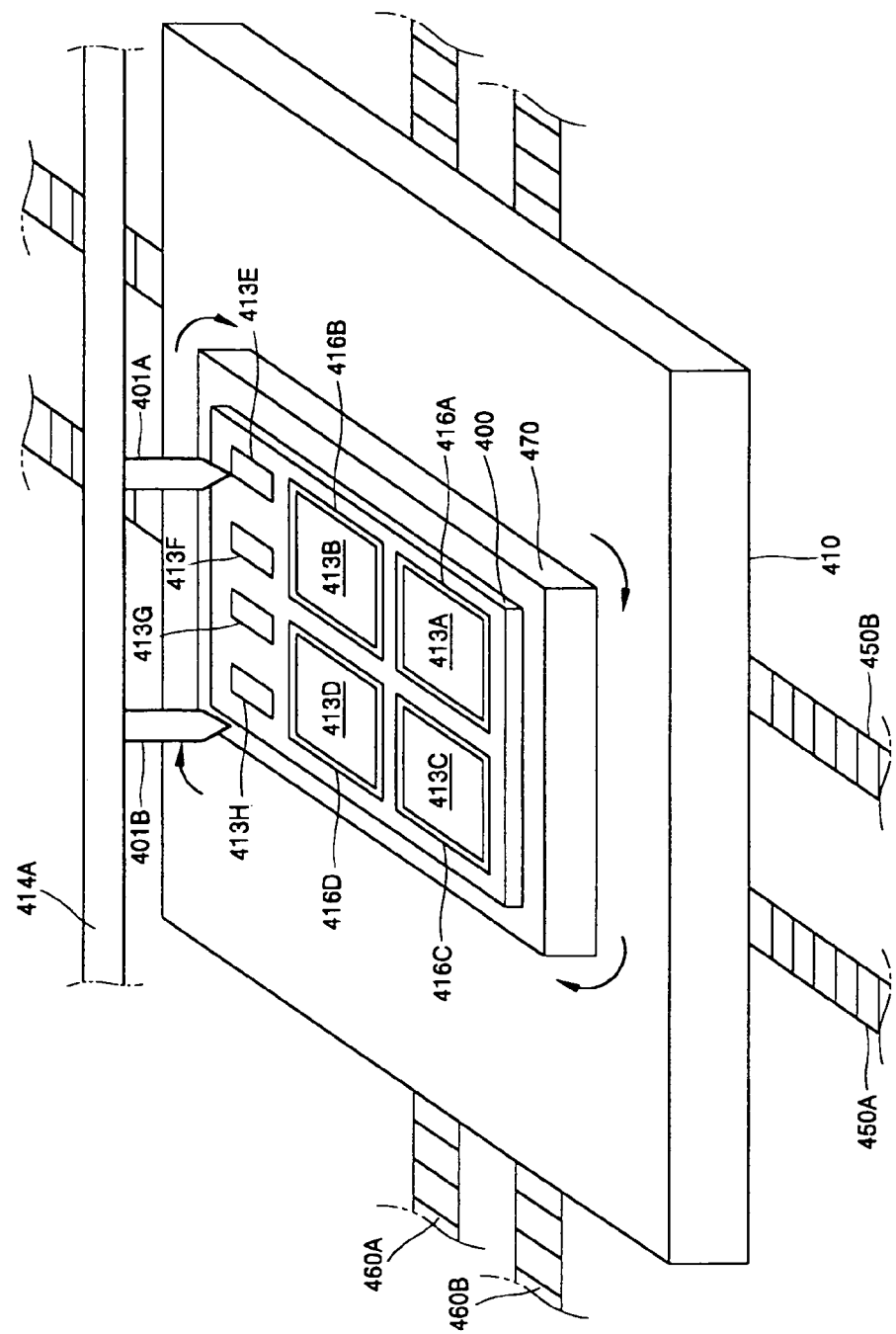

In FIG. 6C, the plate 470 may be rotated by about 90°. Alternatively, the plate 470 may be rotated by 270°. Moreover, the plate 470 may be rotated by other angles dependent upon a desired orientation of the substrate 400.

In FIG. 6D, when the table 410 is driven along the direction parallel to the shorter side of the substrate 400 using the first drivers 450A and 450B, sealant material may be supplied onto the substrate 400 using the first and second syringes 401A and 401B to form each shorter side of the second seal patterns 416E and 416F. Similarly, when the table 410 is driven along the direction parallel to the longer side of the substrate 400 using the second drivers 460A and 460B, each longer side of the second seal patterns 416E and 416F may be formed, thereby forming the second seal patterns 416E and 416F at each outer edge portion of the second image display parts 413E and 413F.

Thus, formation of the first image display parts 413A~413D and the second image display parts 413E~413H may be determined, in part, by a first isolation distance (i.e., a first alignment) between the first and second syringes 401A and 401B aligned and affixed at the supporting bar 414A In addition, the isolation distance may determine formation of the second seal patterns 416E and 416G at each outer edge portion of the second image display parts 413E and 413G. Similarly, after the substrate 400 is rotated, formation of the first image display parts 413A~413D and the second image display parts 413E~413H may be determined, in part, by a second isolation distance (i.e., a second alignment) between the first and second syringes 401A and 401B aligned and affixed at the supporting bar 414A. In addition, the first and second syringes 401A and 401B can be realigned along the supporting bar 414A to form the second seal patterns 416E/416F or 416E/416G along each outer edge portion of the second image display parts 413E/413F or 413E/413G, respectively. Moreover, the process of FIG. 6D may be repeated in order to form the second seal patterns 416G and 416H along each outer edge portion of the second image display parts 413G and 413H.

According to the present invention, using the exemplary dispenser system for a liquid crystal display panel and by using the exemplary dispensing method using the dispenser system, the substrate 400 upon which the first image display parts 413A~413D of the first size and the second image display parts 413E~413H of the second size are formed may be loaded onto the table 410. Then, the first seal patterns 416A~416D may be formed along each outer edge portion of the first image display parts 413A~413D of the first size. Next, the substrate 400 may be rotated by about 90°, and the second seal patterns 416E~416H may be formed along each outer edge portion of the second image display parts 413E~413H of the second size.

Thus, when the first-image-display parts 413A~413D and second image display parts 413E~413H of different sizes are formed on the substrate 400, time required for forming the first seal patterns 416A~416D and the second seal patterns 416E~416H along each outer edge portion of the first image display parts 413A~413D and the second image display parts 413E~413H may be reduced.

Methods for forming the liquid crystal layer on the liquid crystal display panel may be roughly divided into a vacuum injection method and a dropping method. According to the vacuum injection method, a liquid crystal injection opening of a unit liquid crystal display panel is placed into a container filled with liquid crystal material within a vacuum chamber. Then, liquid crystal material is injected into the liquid crystal display panel according to a pressure difference between an interior and an exterior of the liquid crystal display panel by varying the amount of vacuum within the vacuum chamber. After the liquid crystal material is filled into the liquid crystal display panel, the liquid crystal injection opening is closed to form a liquid crystal layer within the liquid crystal display panel. The liquid crystal injection opening is commonly located along a side of the seal pattern. Accordingly, by using the vacuum injection method, one portion of the seal pattern must remain opened to function as the liquid crystal injection opening.

According to the dropping method, liquid crystal material is dropped and dispensed onto a plurality of TFT array substrates fabricated on a first large-scale mother substrate, or dropped and dispensed onto a plurality of CF substrates fabricated on a second large-scale mother substrate. Then, the first and second mother substrates are attached to each other so that the liquid crystal material is uniformly distributed along entire image display regions by application of pressure to the first and second mother substrates, thereby forming a liquid crystal layer between each of the TFT array and CF substrates. Thus, by using the dropping method, since liquid crystal material is directly dropped onto the substrate, rather than being filled from an external source, seal patterns may be formed in a closed loop pattern encompassing the image display parts in order to prevent leakage of liquid crystal material to areas outside of the image display parts.

Unlike the vacuum injection method, after the liquid crystal layer is formed using the dropping method, the attached first large-scale mother substrate and the second large-scale mother substrate are separated into a plurality of individual unit liquid crystal display panels. However, if the seal patterns are formed using thermosetting sealant material, the sealant material may flow while being heated during subsequent processes of attaching the liquid crystal display panel. Accordingly, the flowed sealant material may contaminate the dropped liquid crystal material. Thus, the seal patterns are preferably formed using ultraviolet (UV)-hardening sealant material. Alternatively, the seal patterns may be preferably formed using a mixture of the UV-hardening sealant material and the thermosetting sealant material.

According to the present invention, the exemplary dispenser system and the exemplary dispensing method using the dispenser system may include loading a substrate having first and second image display parts of different sizes onto a table, and first seal patterns may be formed along each outer edge portion of the first image display parts. Then, the substrate may be rotated, and second seal patterns may be formed along each outer edge portion of the second image display parts. Thus, time required for formation of the first and second seal patterns along outer edge portions of the first and second image display parts may be reduced, thereby increasing productivity of the LCD device.

It will be apparent to those skilled in the art that various modifications and variations can be made in the dispenser system for a liquid crystal display panel and the dispensing method using the dispenser system of the present invention without departing from the spirit or scope of the inventions. Thus, it is intended that the present invention covers the modifications and variations of this invention provided they come within the scope of the appended claims and their equivalents.

What is claimed is:

1. A dispensing method for a liquid crystal display panel, comprising:
   loading a substrate onto a plate on a table, the substrate having a plurality of first image display parts and a plurality of second image display parts;
   supplying a sealant material onto the substrate to form a plurality of first seal patterns along each outer edge portion of the plurality of first image display parts;
   rotating the plate on the table to rotate the substrate on the table; and
   supplying the sealant material onto the substrate to form a plurality of second seal patterns along each outer edge portion of the plurality of second image display parts.

2. The method according to claim 1, wherein each of the plurality of first image display parts have a first area size and each of the plurality of second image display parts have a second area size different from the first area size.

3. The method according to claim 1, wherein the forming of a plurality of first seal patterns comprises:
   forming short side portions of the plurality of first seal patterns by supplying the sealant material onto the substrate using a plurality of syringes having a first alignment while the table is driven along a direction parallel to a shorter side of the substrate; and
   forming long side portions of the plurality of first seal patterns by supplying the sealant material onto the substrate using the plurality of syringes having a second alignment while the table is driven along a direction parallel to a longer side of the substrate.

4. The method according to claim 3, wherein the forming short side portions of the plurality of first seal patterns and the forming long side portions of the plurality of first seal patterns are alternately performed.

5. The method according to claim 3, further comprising changing the first alignment of the plurality of syringes to the second alignment after rotating the substrate.

6. The method according to claim 5, wherein the substrate is rotated by about 90°.

7. The method according to claim 3, further comprising changing the first alignment of the plurality of syringes to the second alignment during rotating the substrate.

8. The method according to claim 7, wherein the substrate is rotated by about 90°.

9. The method according to claim 1, wherein the forming of a plurality of second seal patterns comprises:
   forming short side portions of the plurality of second seal patterns by supplying the sealant material onto the substrate using at least one syringe while the table is driven along a direction parallel to a shorter side of the substrate; and
   forming long side portions of the plurality of second seal patterns by supplying the sealant material onto the substrate using the at least one syringe while the table is driven along a direction parallel to a longer side of the substrate.

10. The method according to claim 9, wherein the forming short side portions of the plurality of second seal patterns and the forming long side portions of the plurality of second seal patterns are alternately performed.

* * * * *